US009638203B2

(12) United States Patent
Bucking et al.

(10) Patent No.: US 9,638,203 B2
(45) Date of Patent: May 2, 2017

(54) BEARING HOUSING (71) Applicant: BorgWarner Inc., Auburn Hills, MI (US)

(72) Inventors: Michael Bucking, Asheville, NC (US); Rajmohan Chandramohanan, Fletcher, NC (US); Kurtis Henderson, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/854,751

(22) Filed: Sep. 15, 2015

(65) Prior Publication Data

US 2017/0074279 A1  Mar. 16, 2017

(51) Int. Cl.
| | |
|---|---|
| *F04D 29/063* | (2006.01) |
| *F16C 33/66* | (2006.01) |
| *F04D 25/04* | (2006.01) |
| *F04D 29/056* | (2006.01) |
| *F04D 29/40* | (2006.01) |

(52) U.S. Cl.
CPC ......... *F04D 29/063* (2013.01); *F04D 25/045* (2013.01); *F04D 29/056* (2013.01); *F04D 29/403* (2013.01); *F16C 33/6662* (2013.01)

(58) Field of Classification Search
CPC .... F04D 29/063; F04D 29/056; F04D 29/403; F04D 25/045; F01D 25/16; F01D 25/18; F01D 25/24; F16C 33/6659; F16C 33/6662; F16C 33/6666; F16C 33/6685; F16C 33/236
See application file for complete search history.

(56) References Cited

U.S. PATENT DOCUMENTS

| | | | | |
|---|---|---|---|---|
| 1,794,921 A | * | 3/1931 | Ramsey | F16N 7/18 184/11.1 |
| 2,447,671 A | * | 8/1948 | Schuck | F16C 33/6666 384/468 |
| 2,918,207 A | * | 12/1959 | Moore | F02C 6/12 415/135 |
| 2,953,416 A | * | 9/1960 | Collins | F01D 11/003 384/251 |
| 3,180,568 A | * | 4/1965 | Oettle | F01D 11/003 277/412 |
| 3,494,679 A | * | 2/1970 | Burdette | F04D 29/057 277/423 |

(Continued)

FOREIGN PATENT DOCUMENTS

| | | |
|---|---|---|
| EP | 2261482 A1 | 12/2010 |
| WO | 2013106303 A1 | 7/2013 |
| WO | 2015013114 A1 | 1/2015 |

*Primary Examiner* — Gregory Anderson
*Assistant Examiner* — Wayne A Lambert
(74) *Attorney, Agent, or Firm* — BrooksGroup (57) ABSTRACT

A number of variations may include a product that may be usable with a turbocharger system and may include a housing that may define a lubrication bore. A bearing assembly may be positioned in the housing. A shaft may extend through, and may be supported by, the bearing assembly. A turbine wheel may be connected to the shaft. An end cap may be connected between the housing and the turbine wheel. The end cap may define a cooling chamber. A spray head may provide an opening between the lubrication bore and the cooling chamber.

25 Claims, 6 Drawing Sheets

(56) References Cited

U.S. PATENT DOCUMENTS

| | | | | |
|---|---|---|---|---|
| 3,625,576 | A * | 12/1971 | Miller | F01D 25/186 384/138 |
| 3,628,835 | A * | 12/1971 | Cornish | F16C 19/364 384/465 |
| 3,740,170 | A * | 6/1973 | Miller | F01D 25/125 184/6.11 |
| 3,767,949 | A * | 10/1973 | Newill | F16C 33/664 310/90 |
| 3,778,194 | A * | 12/1973 | Miller | F01D 25/186 415/175 |
| 3,885,842 | A * | 5/1975 | Furutsu | F16C 19/388 384/468 |
| 3,961,867 | A * | 6/1976 | Woollenweber | F01D 5/025 277/370 |
| 4,095,857 | A * | 6/1978 | Palmer | F01D 25/186 184/6.11 |
| 4,128,283 | A * | 12/1978 | Palmer | F01D 25/166 384/287 |
| 4,171,137 | A * | 10/1979 | Aizu | F01D 11/003 277/429 |
| 4,343,378 | A * | 8/1982 | Bremer | F16C 33/6659 139/1 R |
| 4,364,717 | A * | 12/1982 | Schippers | F01D 25/125 415/180 |
| 4,370,106 | A * | 1/1983 | Lauterbach | F01D 25/16 384/126 |
| 4,389,052 | A * | 6/1983 | Shimizu | F01D 25/186 277/346 |
| 4,392,752 | A * | 7/1983 | Shimizu | F01D 11/00 384/135 |
| 4,396,197 | A * | 8/1983 | Shimizu | F01D 25/186 277/346 |
| 4,397,470 | A | 8/1983 | Carroll et al. | |
| 4,453,837 | A * | 6/1984 | Shimizu | F01D 25/168 384/121 |
| 4,479,728 | A * | 10/1984 | Miller | F01D 25/168 384/369 |
| 4,480,440 | A * | 11/1984 | Harper | F02B 39/14 417/407 |
| 4,523,763 | A * | 6/1985 | Asano | F01D 25/183 277/419 |
| 4,664,605 | A * | 5/1987 | Asano | F01D 25/183 184/6.11 |
| 4,721,398 | A * | 1/1988 | Miyashita | F01D 25/164 384/466 |
| 4,725,206 | A * | 2/1988 | Glaser | F01D 25/125 415/175 |
| 4,786,238 | A * | 11/1988 | Glaser | F01D 25/125 415/175 |
| 4,789,253 | A * | 12/1988 | Perego | F01D 25/164 384/517 |
| 4,798,523 | A * | 1/1989 | Glaser | F01D 25/16 184/6.16 |
| 4,865,332 | A * | 9/1989 | Ruetz | F01D 11/003 277/347 |
| 5,267,452 | A * | 12/1993 | Zinsmeyer | F04D 29/063 137/538 |
| 5,601,155 | A * | 2/1997 | Gardner | F16C 33/103 184/11.2 |
| 6,017,184 | A * | 1/2000 | Aguilar | F01D 25/168 415/105 |
| 6,126,414 | A * | 10/2000 | Koike | F01D 25/168 384/105 |
| 8,001,781 | B2 * | 8/2011 | Shibui | F02B 37/10 417/374 |
| 8,047,720 | B2 * | 11/2011 | Ibaraki | F16C 33/664 184/11.1 |
| 8,348,595 | B2 | 1/2013 | Koch et al. | |
| 8,535,022 | B2 * | 9/2013 | Takei | 415/229 |
| 8,602,652 | B1 | 12/2013 | Bradshaw | |
| 8,757,885 | B2 | 6/2014 | Hornbach et al. | |
| 8,794,905 | B2 * | 8/2014 | Matsuyama | F01D 25/186 415/111 |
| 9,163,558 | B1 * | 10/2015 | Chaggar | F02C 6/12 |
| 9,212,700 | B1 * | 12/2015 | Bucking | F16C 37/007 |
| 2002/0141862 | A1 * | 10/2002 | McEwen | F01D 25/18 415/111 |
| 2002/0158418 | A1 * | 10/2002 | Thiesemann | F01D 25/18 277/423 |
| 2005/0047690 | A1 * | 3/2005 | Keramati | F01D 25/168 384/368 |
| 2008/0083227 | A1 * | 4/2008 | Eleftheriou | F01D 25/18 60/772 |
| 2010/0215299 | A1 * | 8/2010 | Waki | F01D 25/18 384/307 |
| 2010/0224143 | A1 | 9/2010 | Rabhi | |
| 2011/0250067 | A1 * | 10/2011 | Schlienger | F01D 11/003 415/230 |
| 2012/0033908 | A1 * | 2/2012 | House | F01D 25/16 384/476 |
| 2012/0034073 | A1 * | 2/2012 | House | F01D 25/16 415/170.1 |
| 2013/0183144 | A1 * | 7/2013 | Schenkenberger | F01D 25/162 415/170.1 |
| 2014/0311831 | A1 | 10/2014 | Huston et al. | |
| 2015/0330240 | A1 * | 11/2015 | Kelly | F02B 39/14 415/1 |

* cited by examiner

BEARING HOUSING

TECHNICAL FIELD

The field to which the disclosure generally relates includes bearing housings and in particular, includes bearing housing end structures in turbocharger systems.

BACKGROUND

A turbocharger, such as that used to charge the intake air of an internal combustion engine, may include a compressor driven by a turbine. The turbine may be connected to the compressor by a common shaft that may be supported for rotation by bearings. The shaft and its connected turbine and compressor wheels may rotate at speeds that approach hundreds of thousands of revolutions per minute. In addition, the turbine wheel may operate in a high temperature exhaust gas environment, wherein heat may be transferred to the turbocharger components.

SUMMARY OF ILLUSTRATIVE VARIATIONS

A product may be usable with a turbocharger system and may include a housing that may define a lubrication bore. A bearing assembly may be positioned in the housing. A shaft may extend through, and may be supported by, the bearing assembly. A turbine wheel may be connected to the shaft. An end cap may be connected between the housing and the turbine wheel. The end cap may define a cooling chamber. A spray head may provide an opening between the lubrication bore and the cooling chamber.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
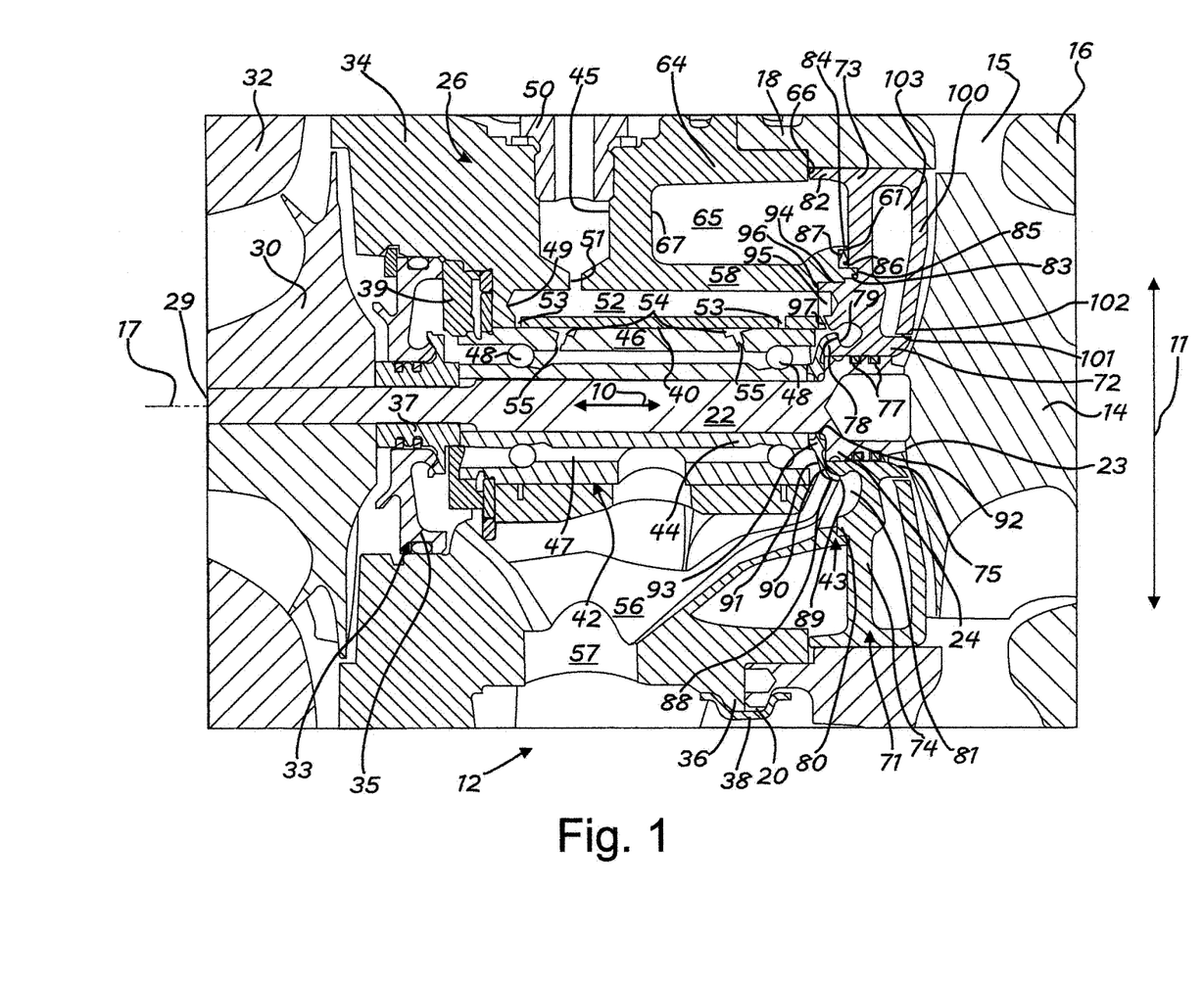
FIG. 1 is a fragmentary cross sectional illustration of a product for use with a turbocharger system according to a number of variations.

In a number of variations a product 12 as illustrated in FIG. 1 may be used with a turbocharger system such as for an internal combustion engine. A turbine wheel 14 as shown in FIG. 1 may exist in a continuous high velocity jet of exhaust gases entering through a volute 15 when the associated engine (not illustrated), is running. The volute 15 may be defined by a turbine housing 16, which may include an axially extending flange 18 that may terminate at a radially outward extending flange 20. The turbine wheel 14 may be connected to a shaft 22. The shaft 22 may include an enlarged segment at or near an end 23 forming a bearing segment 24. The shaft 22 may extend in an axial direction 10 along an axis of rotation 17. The axial direction 10 coincides with left and right in the view of FIG. 1. The line indicating the axial direction 10 is shown coinciding with the axis of rotation 17 of the product 12. An axial extending part will extend on a line parallel to, or on, the axis of rotation 17. The shaft 22 may extend through a center housing referred to as the bearing housing 26. The shaft 22 may include a reduced segment at or near an end 29, which may be connected to a compressor wheel 30. The compressor wheel 30 may rotate with the shaft 22 and the turbine wheel 14. The compressor wheel 30 may be disposed to rotate in a compressor housing 32.

The bearing housing 26 may include a flange 34 on the compressor side, which may extend outwardly in a radially direction 11. The radial direction 11 is generally toward or away from the axis of rotation 17, and includes vertical as viewed in FIG. 1. The flange 34 may be configured for connection to the compressor housing 32. A number of fasteners (not shown), may be used to secure the bearing housing 26 to the compressor housing 32. The bearing housing 26 may also have a flange 36 on the turbine side, which may be configured to mate with the flange 20 of the turbine housing 16. A band clamp 38 may be used to secure the bearing housing 26 to the turbine housing 16.

An opening may be provided in the bearing housing 26 about the central axis 17 forming a bearing cavity 40. The bearing cavity 40 may extend along the central axis 17 and around the shaft 22. A bearing assembly 42 may be positioned in the bearing cavity 40 and may include an inner race 44 and an outer race 46. The inner race 44 may have a hollow, substantially cylindrical shape and may closely fit over the shaft 22 around a bearing segment thereof. The outer race 46 may also have a hollow, substantially cylindrical shape and may fit closely within the bearing cavity 40. A cylindrically shaped gap 47 may be provided between the inner race 44 and the outer race 46, with annular grooves in the inner and outer races carrying a number of ball bearings 48 so that the inner race may freely rotate relative to the outer race.

In a number of variations, a compressor end seal assembly 33 may be disposed around the shaft 22. The seal assembly 33 may include a seal ring 35 that may be seated against the bearing housing 26 and a mating ring 37 that may be disposed around the shaft 22 and that may engage the inner race 44 at its compressor end. In addition, a collar 39 may be seated against the bearing housing 26 and may engage the outer race 46 of bearing assembly 42 on the compressor end.

The bearing assembly 42 may be lubricated and cooled by an oil delivery system that may be provided with a supply line at fitting 50, which may be interconnected with an associated engine's pressurized oil delivery system. The bearing assembly 42 may be provided with a supply of oil from the main feed hole 45 through bore 51 which may extend in the radial direction 11. The bore 51 may interconnect with a bore 52, which may extend in the axial direction 10 alongside the bearing cavity 40. The bore 52 may be cut or cross drilled from the turbine end 43 of the bearing housing 26 and may have a blind end 49. The bore 52 may be intersected by a number of annular grooves 53 that may extend around the axis of rotation 17 and may interconnect the bore 52 with the bearing cavity 40. In addition, a number of angled grooves 54 may be formed in the outer surface of the outer race 46 with intersecting oil jets 55 that open to the gap 47, to supply oil to the ball bearings 48. The bearing housing 26 may have an oil collection cavity 56 with an oil drain 57 to return oil to the associated engine.

The bearing housing 26 may have a first wall section 58 extending in the axial direction 10 toward the turbine wheel 14 and extending around the circumference of the bearing cavity 40. The first wall section 58 may have a terminal end 61. The bearing housing 26 may include a second wall section 64 that may extend in the axial direction 10 toward the turbine wheel 14 and that may also extend around the circumference of the first wall section 58. The second wall section 64 may have a terminal end 66. A cavity forming an air dam 65 may be defined in the radial direction 11 between the first wall section 58 and the second wall section 64. The air dam 65 may have an end wall 67 on a side toward the compressor wheel 30, and may open toward the turbine wheel 14. The air dam 65 may extend around the axis of rotation 17 in a generally annular shape configured to remain separated from the oil collection cavity 56.

In a number of variations the turbine end 43 of the bearing housing 26 may be engaged by an end cap 71. The end cap 71 may be connected with the bearing housing 26 through fasteners (not shown), such as bolts or other mechanical devices, or by staking, crimping, bending, or other methods of deformation, or by a press fit, or another fastening or joining method. The end cap 71 may be generally annular in shape and may include an inner wall 72 and an outer wall 73, both of which may be annular or ring shaped, and each of which may extend in the axial direction 10. A radial wall 74 may extend between the inner wall 72 and the outer wall 73 and may be generally disk shaped. The inner wall 72 may define a central opening 75 that may extend through the end cap 71 in the axial direction 10 and may be centered around the axis of rotation 17. The bearing segment 24 of the shaft 22 may be positioned within the opening 75 and may include annular grooves in its outer circumference, which may contain piston-ring type seal rings 77 that seal between the inner wall 72 and the shaft 22. The inner wall 72 may extend toward the bearing housing 26 and may include a flange 78 with an annular ridge 79 projecting outward in the radial direction 11. A central wall 80 may project from the radial wall 74 toward the bearing housing 26 so that a cooling chamber 81 may be defined between the inner wall 72 at the area of the annular ridge 79 and the central wall 80. The cooling chamber 81 may be annular in shape and may extend around the central axis 17. At its bottom, the cooling chamber 81 may drain into the oil collection cavity 56.

The outer wall 73 of the end cap 71 may include a flange 82 that may extend toward the bearing housing 26 and that may engage with the terminal end 66 of the second wall section 64, around its circumference. In a number of variations the radial wall 74 may define a groove 83 that may extend into the radial wall 74 from the side of the bearing housing 26. The groove 83 may be annular in shape and may be located radially outward from the central wall 80 and radially inside from the outer wall 73. The terminal end 61 of the first wall section 58 may include an outer ring 84 that may extend toward and engage the bearing housing 26 side of the radial wall 74 radially outside from the groove 83. The terminal end 61 of the first wall section 58 may include an inner ring 85 that may extend toward an engage the bearing housing 26 side of the radial wall 74 further than the outer ring 84 and may be engaged within the groove 83. A chamber 86 may be defined between the inner and outer rings 84, 85 and between the bearing housing 26 and the end cap 71. The chamber 86 may contain a mechanical sealing element 87 that may be a compressed seal since the bearing housing 26 and the end cap 71 do not rotate relative to one another. In a number of variations sealing element 87 may be a labyrinth seal or a tortuous path may be included.

In a number of variations a flinger 88 may be positioned around the shaft 22 at the turbine end 43 of the bearing assembly 42. The flinger 88 may be generally annular in shape and may include a cupped section 90 that may open in the direction of the turbine wheel 14 and may include an outer rim 89. The cupped section 90 may extend radially outward and may curve toward the turbine wheel 14 with a back 91 directed toward the bearing assembly 42 and, after curving, toward the central wall 80. The cupped section 90 may engage the flange 78 outward to the tip of the annular ridge 79. The flinger 88 may include an opening 92 through which the shaft 22 extends. The flinger 88 may also include an annular enlarged section 93 positioned radially outward from and around the opening 92. The annular enlarged section 93 may be captured between the inner race 44 of bearing assembly 42 and the bearing segment 24 of the shaft 22. As a result, the flinger 88 may rotate with the shaft 22. The outer rim 89 of flinger 88 may extend into the cooling chamber 81.

In a number of variations the end cap 71 may include a spray head 94 that may be part of an integrated unit and that may include a cavity 95 formed into the spray head 94 from the side of the bearing housing 26. The cavity 95 may register with the bore 52 so as to be open thereto, and may have a circular rim 96 that may engage the bearing housing 26 around the perimeter of the bore 52 to close the open end of the bore 52. A number of spray jets 97 may be formed through the spray head 94 and may provide discrete openings between the cavity 95 and the cooling chamber 81. The spray jets 97 (and jets 148, 195 described below), may be directed at the back 91 of flinger 88 which may then direct supplied oil against the wall of bearing housing 26 in the cooling chamber 81. The inclusion of multiple spray jets 97 distributed around the cavity 95 may distribute oil along the perimeter of the flinger 88. Heat in the end cap 71 transferred from the turbine, may be collected by oil from the flinger 88 and may be carried out through the drain 57. In addition to cooling the area of the cooling chamber 81, the spray jets 97 and the flinger 88 may direct oil away from the bearing segment 24 helping the seal rings 77 maintain oil separation from the turbine housing 16.

In a number of variations a heat shield 100 may be integrally formed with the end cap 71 and may extend radially inward toward the inner wall 72 from the turbine end of the outer wall 73. The heat shield 100 may have an inner opening 101 through which the inner wall 72 may extend. Separation of the inner end 102 of the heat shield 100 from the inner wall 72 may allow for relative expansion and contraction during heat up and cool down. An air gap 103 may be defined between the heat shield 100 and the radial wall 74. The heat shield 100 and the air gap 103 may help reduce heat transfer to the bearing assembly 42.

Figure 2:
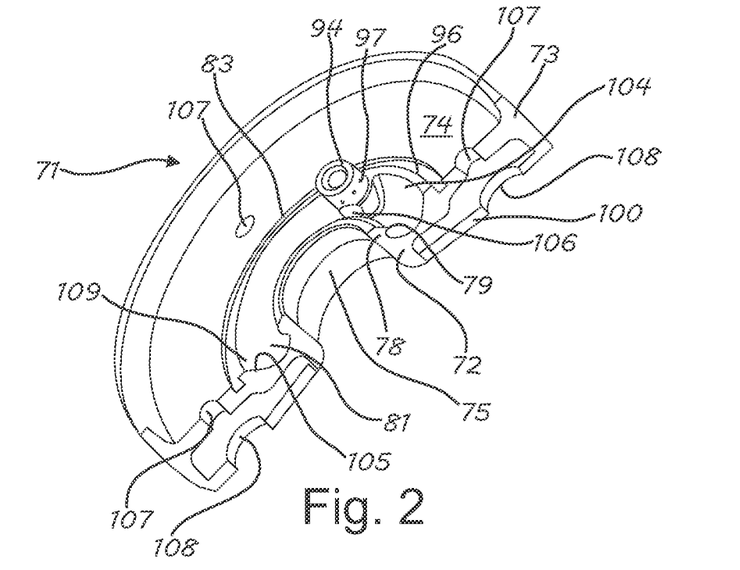
FIG. 2 is an isometric view of a part of an end cap with integrated heat shield and spray head according to a number of variations.

In a number of variations as illustrated in FIG. 2, the end cap 71 is shown in a sectioned, perspective view. The outer wall 73 may extend around the outer perimeter of the end cap 71 and the inner wall 72 may define an inner perimeter of the end cap 71 around the opening 75. The radial wall 74 may include the groove 83 and the central wall 96. The cooling chamber 81, may be asymmetric from top 104 to bottom 109 with a steep downward slope 105 at the bottom 109 to efficiently drain oil, including during a hot shut down scenario or angled turbocharger orientation to prevent coking that might otherwise be caused by allowing hot oil to sit on the end cap 71. In addition, the cooling chamber 81 may extend deeper into the end cap 71 in the axial direction 10 at the top 104 as compared to at the bottom 109. The spray head 94 may extend from within the cooling chamber 81 creating a reduced area section 106 of the cooling cavity 81 at the spray head 94. The spray jets 97 may be distributed around the spray head 94. The end cap 71 may have a number of mounting holes 107 for connecting the end cap 71 to the bearing housing 26. A number of access holes 108 may be defined through the heat shield 100 in line with the mounting holes 107 for fastener access. Inclusion of the end cap 71 may advantageously allow boring the bearing cavity 40 completely through the bearing housing 26 at full diameter without a blind end. In other words, access to the bearing cavity 40 through either the turbine or compressor end of the bearing housing 26 may be gained at the complete diameter of the bearing cavity during manufacturing, before the end cap 71 is connected.

Figure 3:
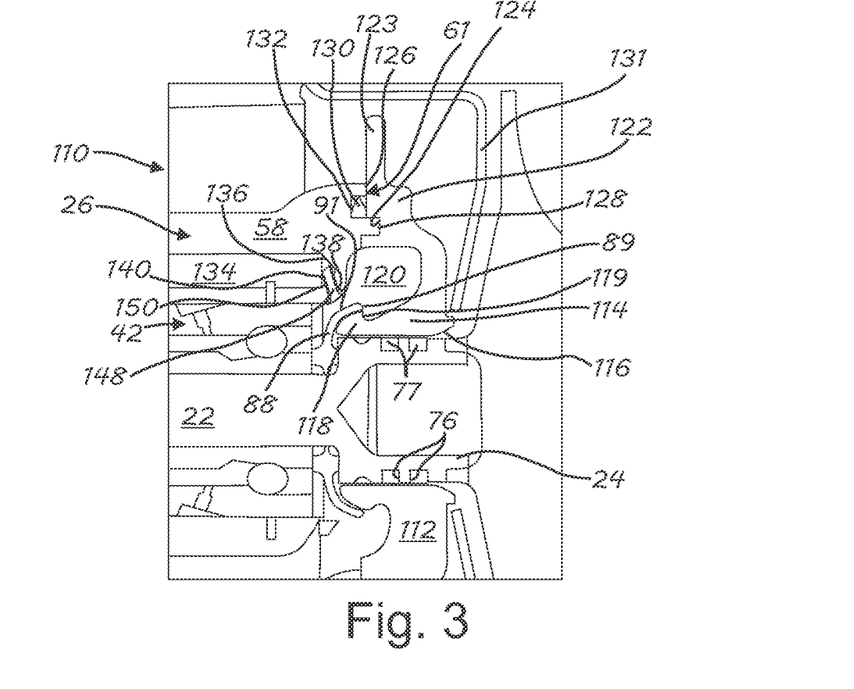
FIG. 3 is a fragmentary outline cross sectional illustration of a product for use with a turbocharger system according to a number of variations.

In a number of variations as illustrated in FIG. 3, where like elements have the same reference numbers as used in FIG. 1, a product 110 may include a shaft 22 supported in a bearing housing 26 by a bearing assembly 42. A flinger 88 may be captured between the bearing assembly 42 and a bearing segment 24 of the shaft 22. An end cap 112 may be positioned against the terminal end 61 of the first wall section 58. The end cap may have an inner wall 114 defining an opening 116 around the axis of rotation 17. The bearing segment 24 of the shaft 22 may be positioned in the opening 116. The bearing segment 24 may include annular grooves 76 in its outer circumference, which may contain piston-type seal rings 77 that seal between the inner wall 114 and the shaft 22. The inner wall 114 may extend toward the bearing housing 26 and may include a flange 118 extending toward the bearing housing 26 with an annular ridge 119 projecting outward in the radial direction 11. In a number of variations a cooling chamber 120 may be defined between the bearing housing 26 and the end cap 112. The end cap 112 may have a radial wall 122 that may define a groove 124 that may extend into the radial wall 122 from the side of the bearing housing 26. The groove 124 may be annular in shape and may be located radially outward from the cooling chamber 120. The terminal end 61 of the first wall section 58 may include an outer ring 126 that may extend toward an engage the bearing housing side of the radial wall 122 radially outside from the groove 124. The terminal end 61 of the first wall section 58 may include an inner ring 128 that may extend further than the first ring 126 toward and engage the bearing housing side of the radial wall 122, and may be engaged within the groove 124. A chamber 130 may be defined between the inner and outer rings 128, 126 and between the bearing housing 26 and the end cap 112. The chamber 130 may contain a mechanical sealing element 132 that may be a compressed seal since the bearing housing 26 and the end cap 112 do not rotate relative to one another. The end cap 112 may include a radial wall 123 that may extend radially outward beyond the first wall section 58, and may provide for connection of the end cap 112 to the bearing housing 26. A separate heat shield 131 may be positioned between the end cap 112 and the turbine wheel 14 to reduce heat transfer to the end cap 112.

Figure 4:
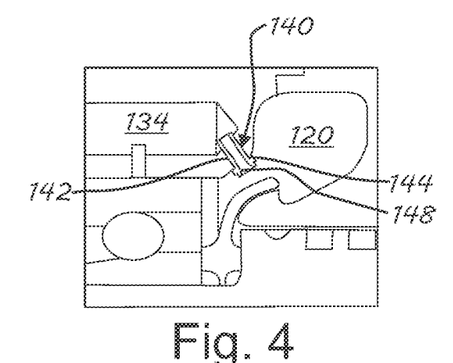
FIG. 4 is a fragmentary outline cross sectional illustration of a product for use with a turbocharger system according to a number of variations.
Figure 5:
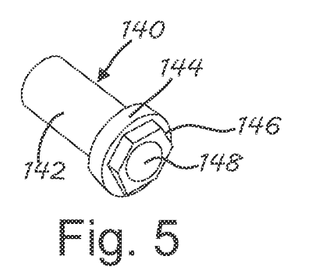
FIG. 5 is an isometric view of a spray head according to a number of variations.

In a number of variations the bearing housing may include a lubrication system bore 134 that may be formed from the compressor end and may terminate at a blind end 136. An opening 138 may be formed through the bearing housing 26 from the bore 134 to the cooling chamber 120. The opening 138 may be directed at the back 91 of the flinger 88. A spray head 140 may be a spray fitting that may be may be pressed into, or otherwise secured in, the opening 138. With additional reference to FIGS. 4 and 5, the spray head 140 may have a cylindrical segment 142 that may be received within the opening 138. Adjacent the cylindrical section 142, the spray head 140 may have an enlarged segment 144 with a circumference that is greater than the cylindrical segment 142 and that may be seated against the bearing housing 26 when the cylindrical segment 142 is positioned in the opening 138. Adjacent the enlarged segment 144, the spray fitting may have a hexagonal segment 146 that may facilitate engagement of the spray head 140 by a tool. A spray jet 148 may be an opening and may extend completely through the spray head 140 through each of the cylindrical segment 142, the enlarged segment 144 and the hexagonal segment 146. The spray jet 148 may serve to channel oil and may be formed with a varying cross sectional area 150 to accelerate oil flow to a velocity that produces a spray diffusion pattern to envelope the flinger 88 in a manner that distributes oil and may prevent oil shearing and parasitic losses of the rotating flinger 88.

Figure 6:
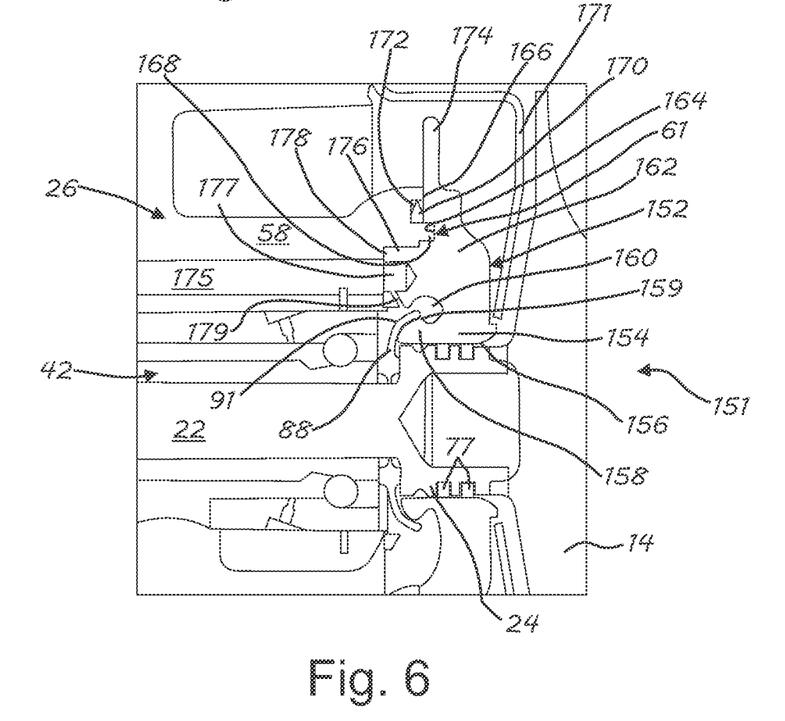
FIG. 6 is a fragmentary outline cross sectional illustration of a product for use with a turbocharger system according to a number of variations.

In a number of variations as illustrated in FIG. 6, where like elements have the same reference numbers as used in FIG. 1, a product 151 may include a shaft 22 supported in a bearing housing 26 by a bearing assembly 42. A flinger 88 may be captured between the bearing assembly 42 and a bearing segment 24 of the shaft 22. With additional reference to FIG. 7, an end cap 152 may be positioned against the terminal end 61 of the first wall section 58. The end cap may have an inner wall 154 defining an opening 156 around the axis of rotation 17. The bearing segment 24 of the shaft 22 may be positioned in the opening 156. The bearing segment 24 may include annular grooves in its outer circumference, which may contain piston-type seal rings 77 that seal between the inner wall 154 and the shaft 22. The inner wall 154 may extend toward the bearing housing 26 and may include a flange 158 extending toward the bearing housing 26 with an annular ridge 159 projecting outward in the radial direction 11. In a number of variations a cooling chamber 160 may be defined between the bearing housing 26 and the end cap 152. The end cap 152 may have a radial wall 162 that may define a groove 164 that may extend into the radial wall 162 from the side of the bearing housing 26. The groove 164 may be annular in shape and may be located radially outward from the cooling chamber 160. The terminal end 61 of the first wall section 58 may include an outer ring 166 that may extend toward and engage the bearing housing side of the radial wall 162 radially outside from the groove 164. The terminal end 61 of the first wall section 58 may include an inner ring 168 that may extend further than the first ring 166 toward and may engage the bearing housing side of the radial wall 162, and may be engaged within the groove 164. A chamber 170 may be defined between the inner and outer rings 168, 166 and between the bearing housing 26 and the end cap 152. The chamber 170 may contain a mechanical sealing element 172 that may be a compressed seal since the bearing housing 26 and the end cap 152 do not rotate relative to one another. The end cap 152 may include a radial wall 174 that may extend radially outward beyond the first wall section 58 and may facilitate connection of the end cap 152 with the bearing housing 26. A separate heat shield 171 may be positioned between the end cap 152 and the turbine wheel 14 to reduce heat transfer to the end cap 152.

Figure 7:
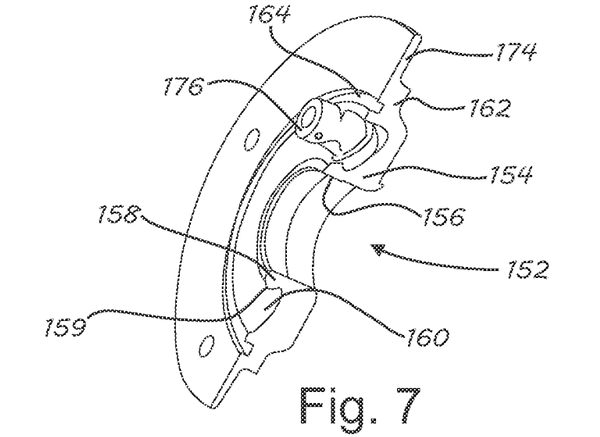
FIG. 7 is an isometric view of a part of an end cap with integrated spray head according to a number of variations.

In a number of variations the bearing housing 26 may include a lubrication system bore 175. The end cap 152 may include a spray head 176 that may be part of an integrated unit and that may include a cavity 177 formed in from the side of the bearing housing 26. The cavity 177 may register with the bore 175 so as to be open thereto, and may have a circular rim 178 that may engage the bearing housing 26 around the perimeter of the bore 175 to close the open end of the bore 175. A number of spray jets 179 may be formed through the spray head 176 and may provide discrete openings between the cavity 177 and the cooling chamber 160. The spray jets 179 may be directed at the back 91 of flinger 88 which directs oil against the wall of bearing housing 26 in the cooling chamber 160.

Figure 8:
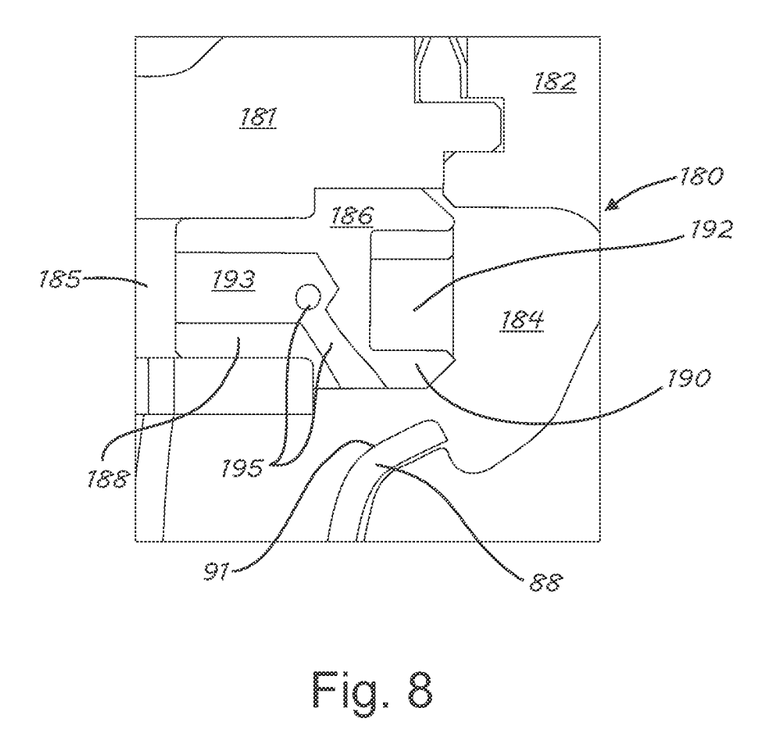
FIG. 8 is a fragmentary outline cross sectional illustration of a product for use with a turbocharger system according to a number of variations.
Figures 9, 10, 11:
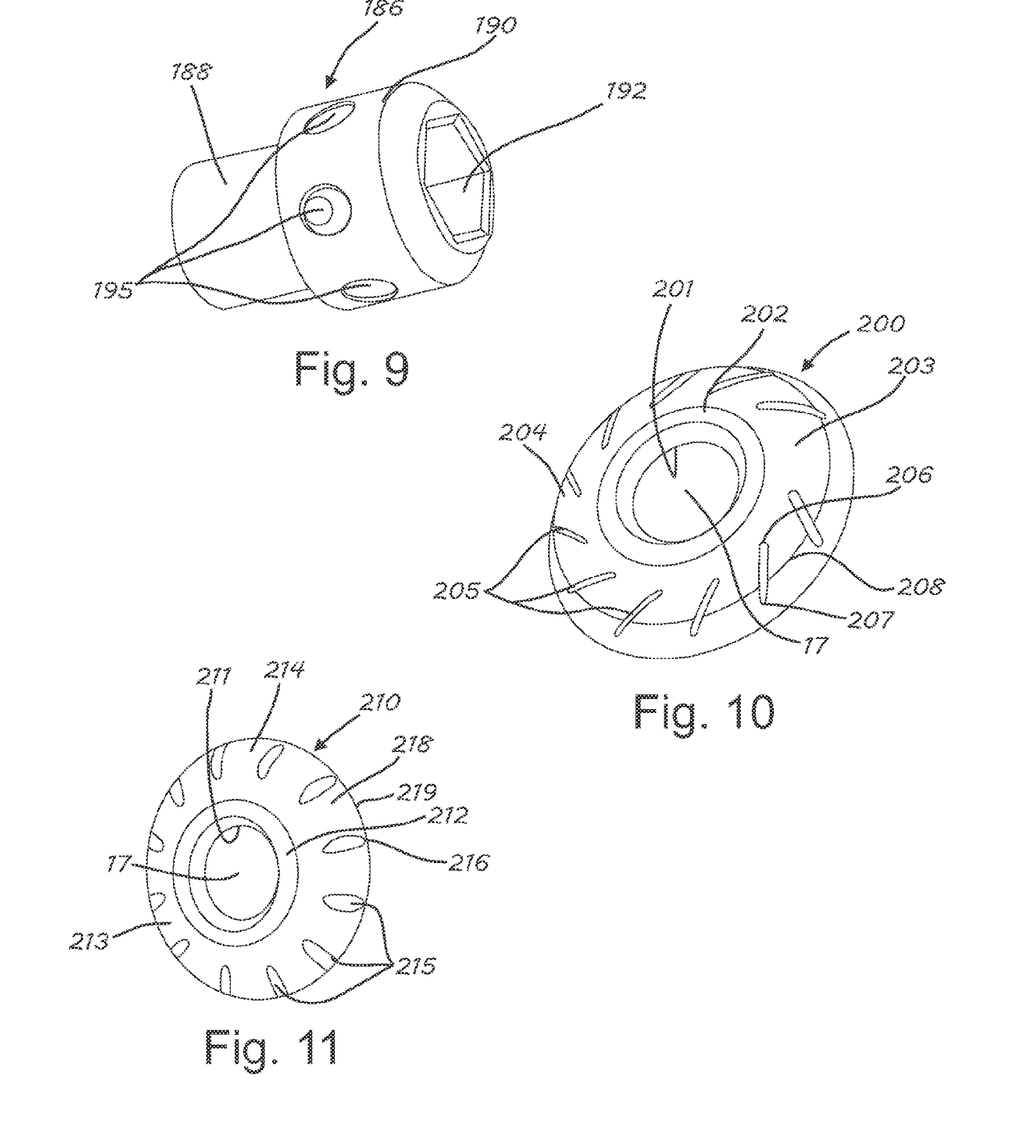
FIG. 9 is an isometric view of a spray head according to a number of variations.
FIG. 10 is an isometric view of an oil flinger according to a number of variations.
FIG. 11 is an isometric view of an oil flinger according to a number of variations.

In a number of variations as illustrated in FIGS. 8 and 9, a product 180 may be used in an assembly like that of FIG. 1. The product 180 may include a bearing housing 181 with an engaged end cap 182. A cooling chamber 184 may be defined between the bearing housing 181 and the end cap 182. A flinger 88 may be positioned between the bearing housing 181 and the end cap 182 and may extend into the cooling chamber 184. The bearing housing 181 may include a lubrication distribution system bore 185 that may be aligned with the cooling chamber 184. A single or multi-port spray head 186 may be a fitting, and may include a cylindrical segment 188 that may be positioned in the bore 185, and an enlarged segment 190 that may be positioned against the bearing housing 181. An opening 192 may extend into the enlarged segment 190 and may be open to the cooling chamber 184. The opening 192 may have a shape, such as a hexagonal shape for receiving a tool that may be used to mount the spray head 186 in the bore 185. A bore 193 may extend into the spray head 186 through the cylindrical segment 188 and may be open to the bore 185. A number of spray jets 195 may be formed through the spray head 186 opening the bore 193 to the cooling chamber 184. Oil from the bore 185 may be delivered through the bore 193 and the spray jets 195 and may be distributed toward the back 91 of the rotating flinger 88 which may direct the oil into the cooling chamber 184.

In a number of variations as illustrated in FIG. 10, a flinger 200, may be used in place of the flinger 88, where it may rotate about the central axis 17. The flinger 200 may include an opening 201, an enlarged section 202, and a cupped section 203. The cupped section 203 may include a back 204 that may have a number of surface features such as slots, through holes, partial depressions, jagged edges or by way of example a set of grooves 205 that may be distributed around the circumference of the flinger 200. The grooves 205 may be oblique relative to the central axis 17 meaning that each may include a leading end 206 at their radially inner ends and at the leading edge of the grooves 205 from the perspective of their direction of rotation. Also, the grooves 205 may each include a trailing end 207 at their radially outer ends and at the trailing edge of the grooves 205 from the perspective of their direction of rotation. The trailing ends 207 may be radially further from the central axis 17 than the leading ends 206, and may be located around the curve 208 of the cupped section 203 from the central axis 17. The grooves 205 may increase the wetted surface area of the flinger 200 and may help distribute oil as the flinger 200 spins.

In a number of variations as illustrated in FIG. 11, a flinger 210, may be used in place of the flinger 88, where it may rotate about the central axis 17. The flinger 210 may include an opening 211, an enlarged section 212, and a cupped section 213. The cupped section 213 may include a back 214 that may have a number of surface features such as grooves 215 that may be distributed around the circumference of the flinger 210. The grooves 215 may each line on a line that may be directed radially outward from the central axis 17 in the radial direction 11, and may form a scalloped flinger 210. The outer ends 216 of the grooves 215 may be located around the curve 218 of the cupped section 213 toward the outer rim 219. The grooves 215 may increase the wetted surface area of the flinger 210 and may hold oil longer than a flinger without grooves increasing the volume of transported oil that is distributed to the wall of the associated cooling chamber.

Figures 12, 13, 14:
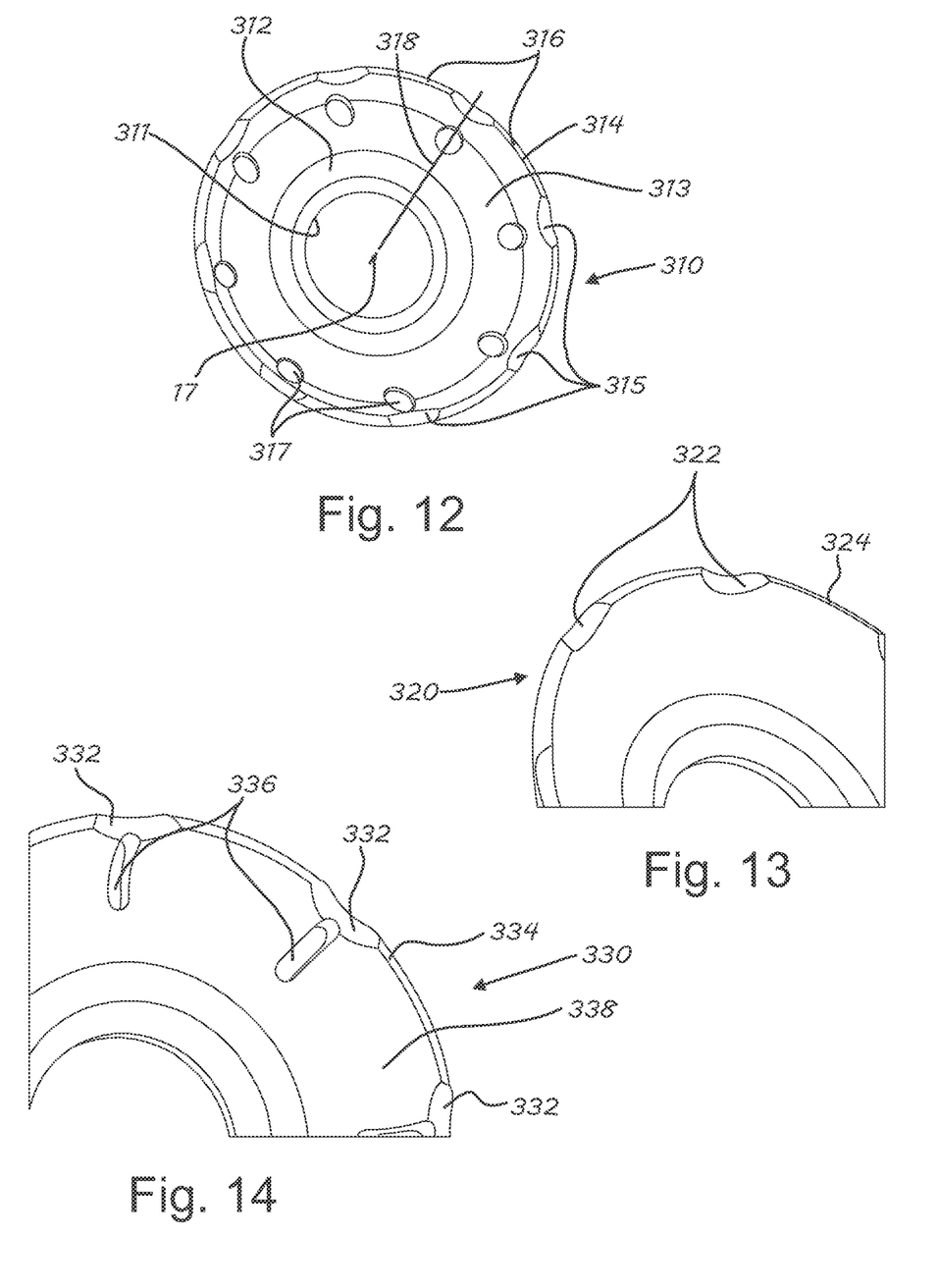
FIG. 12 is an isometric view of an oil flinger according to a number of variations.
FIG. 13 is an isometric view of part of an oil flinger according to a number of variations.
FIG. 14 is an isometric view of part of an oil flinger according to a number of variations.

In a number of variations as illustrated in FIGS. 12-14, a flinger for use in place of the flinger 88 may be provided with alternative surface features to improve oil transportation and distribution during rotation. With reference to FIG. 12, a flinger 310 may include an opening 311, an enlarged section 312, and a cupped section 313. The cupped section 313 may extend to an outer rim 314. The outer rim 314 may have a number of surface features such as scallops 315 that may be distributed around the circumference of the flinger 310. The scallops 315 may be cut or formed through the outer rim 314 to disrupt the profile providing a number of lands 316 where each may be between a set of adjacent scallops 315. The flinger 310 may include a number of through holes 317, that may be circular openings and that may extend completely through the cupped section 313. The through holes 317 may each be aligned with, and positioned radially inside, a respective scallop 315. The through holes 317 may each lie on, and may be centered on, a line 318 that may be directed radially outward from the central axis 17 in the radial direction 11 and that may pass through the center of a scallop 315. The through holes 317 may temporarily hold oil directed at the flinger 310. With reference to FIG. 13, in a number of variations a flinger 320 may be provided with a number of scallops 322 distributed around its outer rim 324. The flinger 320 may not include through holes. With reference to FIG. 14, in a number of variations a flinger 330 may be provided with a number of scallops 332 distributed around its outer rim 334. A number of through holes 336 may be provided through the cupped section 338. The through holes 336 may be shaped as elongated slots and may extend completely through the cupped section 338, and may be distributed around the flinger 330. Each through hole 336 may register with a respective scallop 332, so that the scallop 332 and the through hole 336 form a common opening where the through hole 336 may feed oil in its respective scallop 332.

Through the foregoing variants, the amount of heat transferred away from a bearing assembly and the supported shaft may be maximized. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product usable with a turbocharger system and may include a housing defining a lubrication bore. A bearing assembly may be positioned in the housing. A shaft may extend through, and may be supported by, the bearing assembly. A turbine wheel may be connected to the shaft. An end cap may be connected between the housing and the turbine wheel. The end cap may define a cooling chamber. A spray head may provide an opening between the lubrication bore and the cooling chamber.

Variation 2 may include the product according to variation 1 wherein the end cap may include an integral heat shield.

Variation 3 may include the product according to variation 1 or 2 wherein the spray head may define a cavity that may register with the lubrication bore. The end cap may define at least one spray jet that may open between the cavity and the cooling chamber.

Variation 4 may include the product according to any of variations 1 through 3 wherein the spray head may be positioned in the housing and may defines a spray jet with an opening that accelerates oil flow.

Variation 5 may include the product according to any of variations 1 through 3 wherein the spray head comprises a spray fitting that may be positioned in the lubrication bore, and may include multiple ports that may open between the lubrication bore and the cooling chamber.

Variation 6 may include the product according to any of variations 1 through 5 and may include a flinger with an outer rim that extends into the cooling chamber, wherein the spray head is directed at the flinger.

Variation 7 may include the product according to variation 6 wherein the flinger may include a back with a number of grooves.

Variation 8 may include the product according to variation 7 wherein the flinger may include a cupped section that may have a curve, and the grooves extend toward the outer rim around the curve.

Variation 9 may include the product according to any of variations 1 through 8 and may include a seal that may be compressed between and against the housing and the end cap.

Variation 10 may include a product usable with a turbocharger system and may include a bearing housing that may define a lubrication bore. A bearing assembly may be positioned in the bearing housing. A shaft may extend through, and may be supported by, the bearing assembly. A turbine wheel may be connected to the shaft. An end cap may be connected between the bearing housing and the turbine wheel. The end cap, in cooperation with the bearing housing, may define a cooling chamber. A spray head may provide an opening between the lubrication bore and the cooling chamber.

Variation 11 may include the product according to variation 10 wherein the end cap may include an integral heat shield.

Variation 12 may include the product according to variation 10 or 11 wherein the spray head may extend from the end cap and may define a cavity that may registers with the lubrication bore. The end cap may define at least one spray jet that may open between the cavity and the cooling chamber.

Variation 13 may include the product according to variation 10 wherein the spray head may be positioned in the bearing housing and may define a spray jet that may have an opening that may have a varying cross section that accelerates oil flow.

Variation 14 may include the product according to variation 10 wherein the spray head may comprise a spray fitting positioned in the lubrication bore that may have multiple ports that may open between the lubrication bore and the cooling chamber.

Variation 15 may include the product according to any of variations 10 through 14 and may include a flinger that may have an outer rim that may extend into the cooling chamber. The spray head may be directed at the flinger.

Variation 16 may include the product according to variation 15 wherein the flinger may include a back that may have a number of surface features.

Variation 17 may include the product according to variation 16 wherein the flinger may include a cupped section that may have a curve along the back, and the surface features may extend around the curve toward the outer rim.

Variation 18 may include the product according to variation 15 wherein the flinger may rotate around an axis and wherein the surface features may be grooves that may each be disposed along a radial line extending from the axis.

Variation 19 may include the product according to variation 15 wherein the flinger may rotates around an axis and wherein the surface features may be grooves that may each be disposed along a line that is oblique relative to the axis.

Variation 20 may include a product usable with a turbocharger system that may include a bearing housing defining a lubrication bore. A bearing assembly may be positioned in the bearing housing. A shaft may extend through and may be supported by the bearing assembly. A turbine wheel may be connected to the shaft. An end cap may be connected between the bearing housing and the turbine wheel. The end cap, in cooperation with the bearing housing, may define a cooling chamber. The cooling chamber may have a top and a bottom, and may be asymmetric from the top to the bottom. A spray head may provide an opening between the lubrication bore and the cooling chamber.

The above description of select variations within the scope of the invention is merely illustrative in nature and, thus, variations or variants thereof are not to be regarded as a departure from the spirit and scope of the invention.

What is claimed is:

1. A product usable with a turbocharger system comprising a housing defining a lubrication bore, a bearing assembly positioned in the housing, a shaft extending in an axial direction through and supported by the bearing assembly, a turbine wheel connected to the shaft, an end cap disposed between the housing and the turbine wheel, the end cap defining a cooling chamber as an annular depression in the end cap, and a spray head providing an opening between the lubrication bore and the cooling chamber the end cap having a radial wall that extends radially outward relative to the shaft, the spray head formed as a cylindrical projection extending in the axial direction from the radial wall within the annular depression and the cylindrical projection extending from the end cap completely across the cooling chamber and engaging the housing around the lubrication bore.

2. The product according to claim 1 wherein the end cap includes an inner wall extending in the axial direction along the shaft and an outer wall extending in the axial direction to a projecting flange that engages the housing, wherein the radial wall extends from the inner wall to the outer wall, and the end cap includes an integral heat shield extending from the outer wall opposite the flange and extending in a radial direction toward the shaft to a terminal end that forms an opening through which the inner wall extends.

3. The product according to claim 1 wherein the lubrication bore has an open end with a cross section of a first diameter and wherein the spray head defines a cavity that registers with the lubrication bore at the open end, the cavity having a second diameter that is approximately equal in size to the first diameter, and the end cap defines at least one linear extending spray jet that opens directly to the cavity and directly to the cooling chamber.

4. The product according to claim 1 wherein the end cap defines a passage between the lubrication bore and the cooling chamber that extends through a cavity formed within the cylindrical projection, with a plurality of spray jet openings distributed around the cylindrical projection each of which opens directly to the cavity and directly to the cooling chamber, the spray jet openings directed in multiple directions.

5. The product according to claim 1 wherein the spray head comprises a spray fitting with multiple ports that open between the lubrication bore and the cooling chamber.

6. The product according to claim 1 further comprising a flinger with an outer rim that extends into the cooling chamber wherein the spray head defines a jet connecting the lubrication bore with a cavity and wherein the jet points at the flinger so that a lubricant flowing from the lubrication bore through the jet, leaves the jet and first impinges on the flinger.

7. The product according to claim 6 wherein the outer rim is pointed away from the shaft with a number of irregularities formed as scalloped out sections in the outer rim, with through holes extending completely through the flinger at the scalloped out sections.

8. The product according to claim 7 wherein the flinger includes a cupped section that has a curve so that the outer rim is pointed into the annular depression.

9. The product according to claim 1 further comprising a seal compressed between and against the housing and the radial wall of the end cap wherein the housing includes a wall section extending in the axial direction toward the end cap, and the wall section has a terminal end with an inner ring and an outer ring between which a chamber is defined, the chamber containing the seal, wherein the inner ring extends at the terminal end further than the outer ring, and wherein the end cap defines a groove into which the inner ring is received.

10. A product usable with a turbocharger system comprising a bearing housing defining a lubrication bore, a bearing assembly positioned in the bearing housing, a shaft extending in an axial direction through and supported by the bearing assembly, a turbine wheel connected to the shaft, the bearing housing including a housing wall extending in the axial direction and through which the lubrication bore is formed, wherein the housing wall has a terminal end, an end cap disposed between the bearing housing and the turbine wheel, the end cap including a radial wall extending in a radial direction that is directed away from the shaft, the radial wall engaging the terminal end of the housing wall and extending outward away from the shaft in the radial direction beyond the housing wall, wherein the end cap includes an inner wall that projects from the radial wall in the axial direction and is located adjacent the shaft and includes a central wall that projects from the radial wall in the axial direction and is located at the terminal end, the radial wall extending between the inner wall and the central wall, and the end cap, in cooperation with the bearing housing defining a cooling chamber that extends in the axial direction from the end cap to the housing and that extends in the radial direction from the inner wall to the central wall, and a spray head providing an opening between the lubrication bore and the cooling chamber.

11. The product according to claim 10 comprising a turbine housing covering the turbine wheel, where the turbine housing has a first flange fit to the bearing housing, wherein the end cap includes an outer wall extending in the axial direction to a second flange that engages the bearing housing, the end cap extending radially outward beyond the turbine wheel with the outer wall contacting the turbine housing radially outside the turbine wheel, wherein the radial wall extends from the inner wall to the outer wall, and the end cap includes an integral heat shield extending from the outer wall and in the radial direction toward the shaft to a terminal end that forms an opening through which the inner wall extends.

12. The product according to claim 10 wherein the lubrication bore has an open end with a cross section of a first diameter and wherein the spray head extends from the end cap and defines a cavity that registers with the lubrication bore at the open end, the cavity has a second diameter that is substantially equal to the first diameter, and the end cap defines at least one spray jet that opens between the cavity and the cooling chamber.

13. The product according to claim 10 wherein the spray head is positioned in the bearing housing and that defines a spray jet with an opening, wherein the opening has a first end registering with the lubrication bore and the opening has a second end registering with the cooling chamber, and the opening has a mid-section between the first and second ends, with a varying cross section of the opening that is narrower at the mid-section than at the first and second ends and that accelerates oil flow.

14. The product according to claim 10 wherein the spray head comprises a spray fitting with a cylindrical segment positioned against the housing in the lubrication bore and an enlarged segment positioned against the housing outside the lubrication bore, the opening extending through the cylindrical segment and the enlarged segment.

15. The product according to claim 10 further comprising a flinger with an outer rim that extends into the cooling chamber wherein the spray head is configured so that the opening points at the flinger so that a lubricant flowing from the lubrication bore through the opening, leaves the spray head and first impinges on the flinger.

16. The product according to claim 15 comprising an annular ridge extending outward from the inner wall in the radial direction to a tip, the flinger engaged with the annular ridge and extending to the tip.

17. The product according to claim 16 wherein the flinger has a back facing the opening and includes a cupped section that has a curve along the back with grooves formed in the back that extend around the curve.

18. The product according to claim 15 wherein openings are defined completely through the flinger.

19. The product according to claim 10 wherein the end cap includes an inner wall extending in the axial direction along the shaft, the radial wall extending from the inner wall, and the cooling chamber defined, in part, as a depression in each of the inner wall and the radial wall.

20. A product usable with a turbocharger system comprising a bearing housing defining a lubrication bore, a bearing assembly positioned in the bearing housing, a shaft extending through and supported by the bearing assembly, a turbine wheel connected to the shaft, an end cap disposed between the bearing housing and the turbine wheel, the end cap, in cooperation with the bearing housing defining a cooling chamber, with an annular depression in the end cap defining part of the cooling chamber and a spray head providing an opening between the lubrication bore and the cooling chamber, the opening providing lubricant directly from the lubrication bore to the cooling chamber.

21. The product according to claim 20 wherein the annular depression extends deeper into the end cap at the top than at the bottom.

22. The product according to claim 21 wherein the annular depression has a downward slope that is steeper at the bottom than at the top.

23. The product according to claim 21 wherein the spray head includes an annular wall defining a cavity and the spray head extends from the end cap and the annular wall engages the bearing housing with the cavity open to the lubrication bore.

24. The product according to claim 20 wherein the opening has a first end registering with the lubrication bore and the opening has a second end registering with the cooling chamber, and the opening has a mid-section between the first and second ends, with a varying cross section of the opening that is narrower at the mid-section than at the first and second ends, and that accelerates oil flow.

25. The product according to claim 20 wherein the bearing housing includes a housing wall extending in the axial direction and through which the lubrication bore is formed, wherein the housing wall has a terminal end, the end cap including a radial wall extending in a radial direction that is directed away from the shaft, the radial wall engaging the terminal end of the housing wall and extending outward away from the shaft in the radial direction beyond the housing wall, and a chamber defined between the terminal end and the radial wall with a seal in the chamber.

* * * * *